Sept. 15, 1931.  H. F. MERRIAM  1,823,372
PROCESS OF RECOVERING SULPHUR DIOXIDE FROM EXIT GAS
Filed Aug. 24, 1927
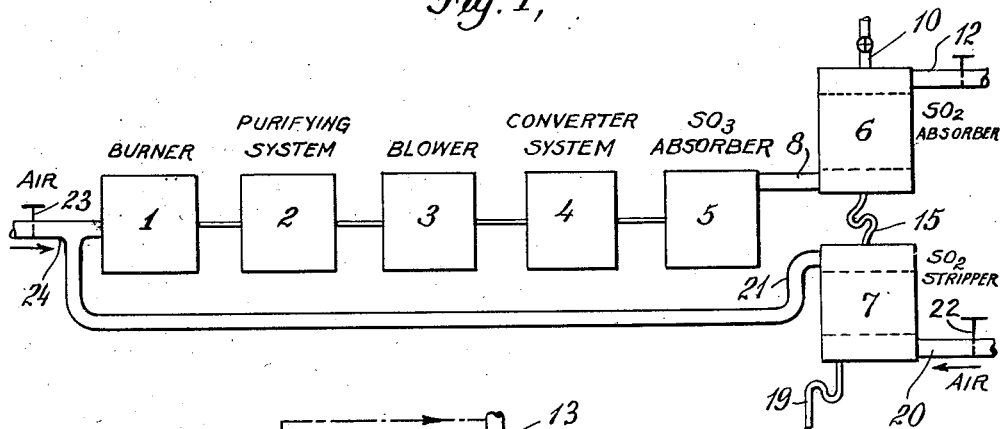
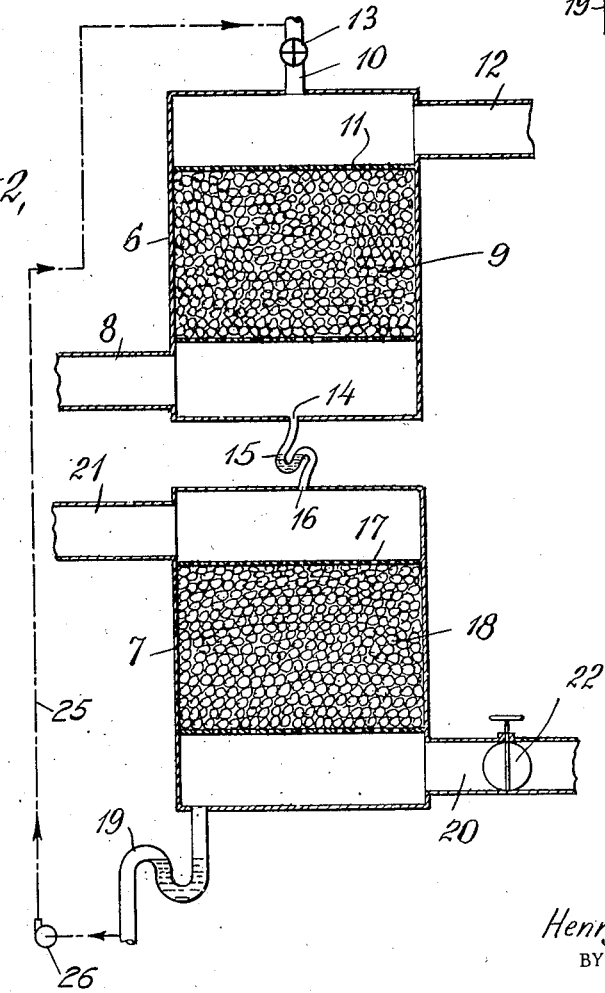
INVENTOR
Henry F. Merriam
BY Forbes Silsby
ATTORNEY Patented Sept. 15, 1931

1,823,372

UNITED STATES PATENT OFFICE

HENRY F. MERRIAM, OF WEST ORANGE, NEW JERSEY, ASSIGNOR TO GENERAL CHEMICAL COMPANY, OF NEW YORK, N. Y., A CORPORATION OF NEW YORK

PROCESS OF RECOVERING SULPHUR DIOXIDE FROM EXIT GAS

Application filed August 24, 1927. Serial No. 215,026.

This invention relates to the manufacture of sulfuric acid and more particularly to a method of treating the exit gas from a contact sulfuric acid system to recover the unconverted sulphur dioxide normally present therein.

In the operation of the contact system for the manufacture of sulfuric acid, it is frequently the case that the exit gas from the plant contains from .2 to 1% of sulphur dioxide, depending upon the efficiency of the converter units. This gas is normally discharged into the atmosphere, thereby causing a direct loss of sulphur as sulphur dioxide with a diminished efficiency of production and at times occasioning complaints from the surrounding community. It has proven almost impossible to convert this small amount of sulphur dioxide remaining in the gas by the catalytic method, and likewise the economic utility of the heretofore proposed methods of recovering this $SO_2$ has been very doubtful.

It is the object of my invention to provide a process whereby the exit gas from a contact sulfuric acid system or other gas containing small amounts of sulphur dioxide may be efficiently treated to recover the sulphur dioxide and whereby the sulphur dioxide so recovered may be subsequently utilized for the production of sulfuric anhydride or sulfuric acid.

My invention is based upon the discovery that small amounts of sulphur dioxide, such as may occur in the exit gas from a contact system, may be readily absorbed in water or weak acid by contact therewith, and that such absorbed sulphur dioxide may be efficiently liberated from the solvent liquid under substantially isothermal conditions by contacting a stream of air therewith.

Broadly, my invention consists in absorbing sulphur dioxide from gases containing small amounts of the same, as for example exit gas from a contact system, in water, dilute acid, or other suitable solvent liquid, subsequently treating such solvent liquid under substantially isothermal conditions with a stream of air to liberate absorbed sulphur dioxide, and utilizing the mixture of air and sulphur dioxide thereby obtained for the combustion of sulphur bearing material to produce a stronger sulphur dioxide gas.

For a more complete understanding of my invention, reference should be had to the accompanying drawings, in which:

Fig. I is a diagrammatic flow sheet of a sulfuric acid plant employing my invention, and Fig. II is an elevation in section illustrating in more detail the arrangement of the absorbing and stripping towers hereinafter referred to.

In the well-known contact type system for the manufacture of sulfuric anhydride or sulfuric acid, a relatively strong sulphur dioxide gas (5–12% $SO_2$) is first produced by the combustion of sulphur bearing material such as brimstone or pyrites in a suitable burner 1. The sulphur dioxide gas thus produced is then cooled, freed from impurities, and dried in the purification system 2. Usually the gas is caused to travel through the burner and purification system by suction created by the blower 3. The cold purified gas leaving the blower is under a low positive pressure which serves to force it through the converter system 4 where the sulfuric anhydride is formed. This sulfuric anhydride is then absorbed in strong sulfuric acid in the absorber 5 and the gas leaving the absorber is normally discharged to the atmosphere. This gas, however, even under the best operating conditions, contain from .3 to .4% sulphur dioxide, and under less favorable conditions may contain as much as .8 to 1%. By the discharge of the gas, therefore, into the atmosphere, a very considerable loss of sulphur is encountered.

According to my invention, the exit gas normally passing to the stack is conducted to an absorbing tower 6 where it is contacted in counter current flow with a solvent liquid such as cold water, dilute acid, or other solvent capable of dissolving sulphur dioxide. The gas is introduced at the bottom of the tower 6 through the inlet 8 and passes upwardly through the packing material 9 (see Fig. II) which may consist of pebbles, coke or the like, in counter current flow to a descending stream of the solvent liquid. The solvent liquid is admitted through the inlet 10 and distributed over the packing material by means of a suitable perforated distributing plate 11. The gas, freed from a major portion of the sulphur dioxide by solution thereof in the absorbing liquid, leaves the tower through the outlet 12 and may then be conducted to the stack.

The amount of absorbing liquid entering the inlet 10 will be controlled by a suitable valve 13 in such a manner as to cause any desired amount of absorption of the sulphur dioxide to take place. However, according to my invention, at least sufficient solvent liquid is preferably used to absorb a major portion of the sulphur dioxide present in the exit gas.

The solvent liquid containing the dissolved $SO_2$ flows from the tower 6 through the outlet 14 and thence through the liquid seal 15 at the top of a second tower 7 known as a stripping tower, where it is introduced through inlet 16. The solvent liquid is uniformly distributed over the packing material 18 by means of a perforated plate 17 and flows downwardly therethrough to the bottom of the tower where it is withdrawn through the liquid seal outlet 19. Air at atmospheric temperature is introduced through the inlet 20, controlled by butterfly valve 22, and flows upwardly through the packing material in counter current flow to the descending liquid. This air, upon contact with the sulphur dioxide solution, liberates the sulphur dioxide therefrom, and both air and sulphur dioxide are removed at the top of the tower through the outlet 21.

The absorption and liberation of the sulphur dioxide in the above described manner is based upon the principle that according to Henry's law the equilibrium between sulphur dioxide in the liquid and gas phases is reversible and dependent only on the temperature and sulfurous acid concentration of the solution and on the partial pressure of the sulphur dioxide in the gas. It follows from this principle that if a given volume of gas containing say .7% of sulphur dioxide, is washed with water, weak acid, or other solvent liquid on the counter current principle and this solution of sulphur dioxide is then brought into contact with air on the counter current principle, the air leaving the saturated solution will contain a major portion, at least, of the sulphur dioxide originally present in the gas entering the absorber. Of course, it will be necessary in any particular case to provide absorbing and stripping towers of sufficient height, and containing sufficient packing, to cause intimate contact between the gas and liquid and result in substantial equilibrium conditions being obtained.

The absorbing liquid leaving the stripping tower 7 at the outlet 19 will contain but traces of dissolved sulphur dioxide. This liquid may, therefore, be returned to the top of the absorbing tower 6 through line 25 and pump 26 and thus be recirculated through the system. However, when water is used as the absorbent, this feature of recirculation is not necessary, and the used solvent liquid may be discharged to the sewer and fresh water continually introduced at the top of the absorbing tower.

As stated above, the air leaving the stripping tower through the outlet 21 will contain a major portion of the sulphur dioxide originally present in the exit gas from the sulfuric anhydride absorber. In order to utilize this recovered sulphur dioxide, I return the mixture of air and sulphur dioxide to the burner 1 where a portion of the oxygen of the mixture is employed for the burning of the sulfurous material to produce a relatively strong sulphur dioxide gas suitable for catalytic conversion. In this manner, the small amounts of sulphur dioxide heretofore discharged to the atmosphere are recovered and returned to the system, in a form available for use and with economic efficiency.

In most cases it will be found unnecessary to employ, in the stripping process, as great a volume of gas per unit of solvent liquid as may be treated in the absorbing process. Thus, if 15 cubic feet of exit gas are treated with 1 gallon of solvent liquid, only 10 to 11 cubic feet of air will be required to liberate the sulphur dioxide dissolved in the gallon of absorbing liquid. Ordinarily, however, valve 23 will be closed and the entire volume of air required in the burner will be drawn through the stripping tower. If necessary or desired for a given set of conditions additional air is added through line 24 controlled by valve 23. In any case, the proportions of air which pass through the stripping tower and directly to the burner, as in the system illustrated in Fig. I, may be properly regulated by control of the valves 22 and 23, so that the sulphur dioxide will be efficiently stripped from the solvent liquid. By way of illustrating my invention, I give the following example of the application of my novel process to the recovery of the sulphur dioxide in exit gas from a contact sulfuric acid system:

Exit gas from the sulfuric anhydride absorber 5, containing about .75% sulphur dioxide is conducted through the inlet 8 into the absorbing tower 6 where it is contacted in counter current flow with a stream of water descending over the packing 9. The amount of water is regulated by the valve 13 to provide a flow of about 1 gallon per 15 cubic feet of exit gas measured at standard conditions. Under these conditions about 80% of the sulphur dioxide will be absorbed in the tower 6 and the gas leaving through the outlet 12 contains about .15% sulphur dioxide. Gas of this strength may be safely discharged to the atmosphere without material loss of sulphur and without danger of creating a nuisance to the surrounding community. The water containing the dissolved sulphur dioxide flows downwardly leaving the absorbing tower through the outlet 14 and is conducted through the liquid seal 15 and inlet 16 to the top of the stripping tower 7. In the tower 7 the water is contacted in counter current flow with a stream of air entering through the inlet 20, the stream of air being regulated by the valve 22 to provide a flow of about 10 to 11 cubic feet per gallon of water. Under these conditions 75% or more of the dissolved sulphur dioxide will be liberated and enter the air stream. Thus there is obtained a transfer of at least 60% of the available sulphur dioxide from the exit gas, heretofore lost, thereby increasing the efficiency of production and avoiding the danger of creating a nuisance from sulphur dioxide fumes. The mixture of sulphur dioxide and air obtained at the outlet 21 in the stripping tower is conducted to the burner 1 where it is used for the production of a further quantity of a relatively strong sulphur dioxide gas—containing say 8–12% sulphur dioxide, and suitable for catalytic conversion.

It is to be particularly noted that in my novel process I dispense entirely with the use of heat for the recovery of sulphur dioxide from the weak gas treated, and for this reason avoid the difficulty heretofore encountered in obtaining a process which was economically practicable.

Various modifications may be made in the manner of carrying out my invention, and I do not wish to limit its scope except as defined in the appended claims.

I claim:

1. In a cyclic process for the production of sulfuric acid, the steps of transferring sulphur dioxide in the exit gas from the sulfuric acid system to a solvent liquid, bringing air into contact with the liquid to remove dissolved sulphur dioxide, utilizing the mixture of air and sulphur dioxide thereby obtained for the production of strong sulphur dioxide gas, and utilizing the strong sulphur dioxide gas for the production of sulfuric anhydride.

2. In a cyclic process for the production of sulfuric acid, the steps of transferring upon the counter current principle sulphur dioxide in the exit gas from the sulfuric acid system to a solvent liquid, bringing air into contact with the liquid upon the counter current principle to remove dissolved sulphur dioxide, utilizing the mixture of air and sulphur dioxide thus obtained for the production of strong sulphur dioxide gas, and utilizing the strong sulphur dioxide gas for the production of sulfuric anhydride.

3. In a cyclic process for the production of sulfuric acid, the steps of transferring upon the counter current principle sulphur dioxide in the exit gas from the sulfuric acid system to a body of water, bringing air into contact with the body of water to remove dissolved sulphur dioxide. such transfer taking place under substantially isothermal conditions, utilizing the mixture of air and sulphur dioxide for the production of strong sulphur dioxide gas, and utilizing the strong sulphur dioxide gas for the production of sulfuric anhydride.

4. In a cyclic process for the production of sulfuric acid, the steps of transferring upon the counter current principle sulphur dioxide in the exit gas from the sulfuric acid system to a solvent liquid, bringing air into contact with the liquid upon the counter current principle to remove dissolved sulphur dioxide, returning the solvent liquid after the removal of dissolved sulphur dioxide by the air stream for the solution of a further quantity of sulphur dioxide from the exit gas, utilizing the mixture of air and sulphur dioxide for the production of strong sulphur dioxide gas, and utilizing the strong sulphur dioxide gas for the production of sulfuric anhydride.

In testimony whereof, I affix my signature.

HENRY F. MERRIAM.